United States Patent Office 3,426,877
Patented Feb. 11, 1969

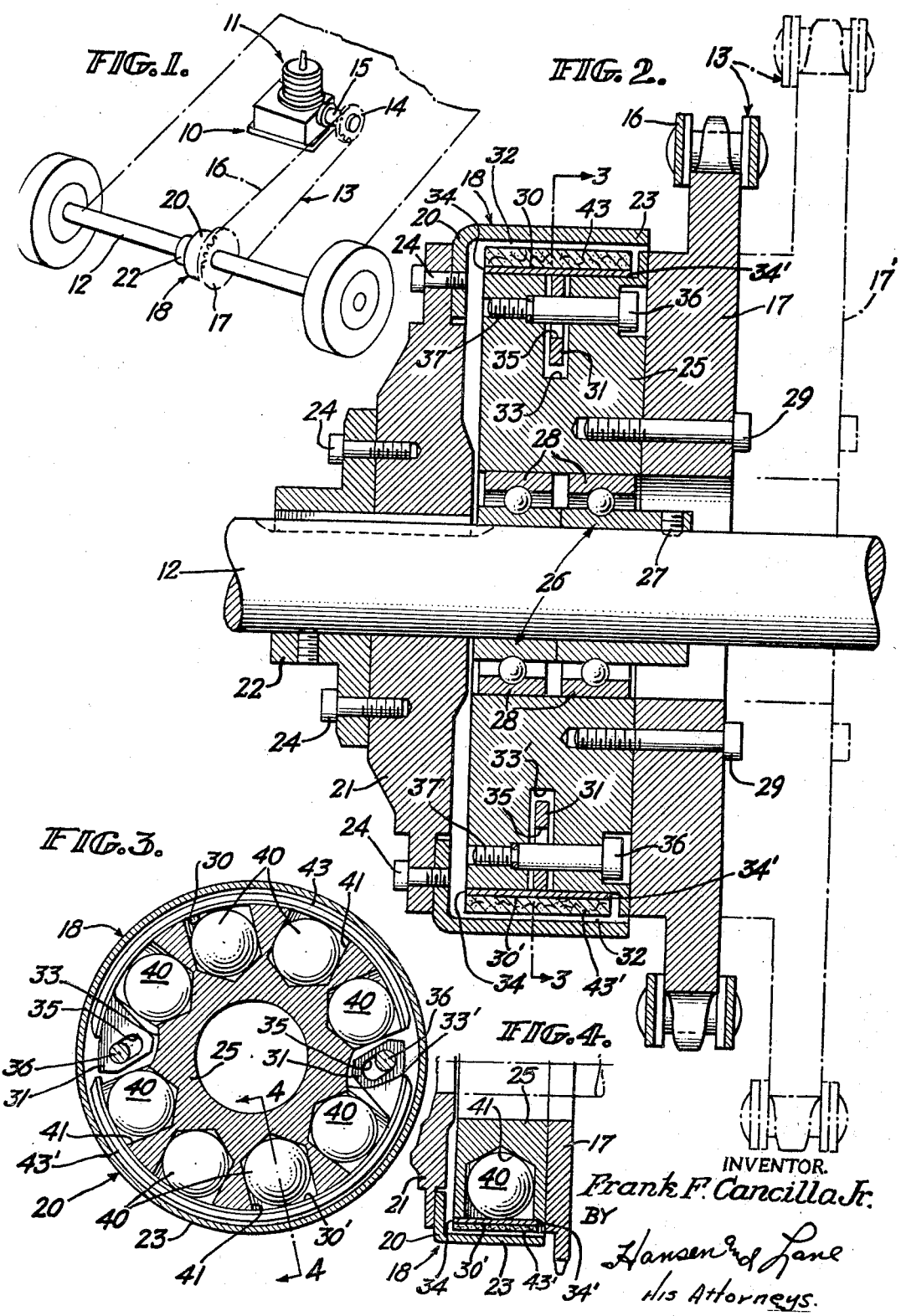

3,426,877
CENTRIFUGAL AXLE CLUTCH
Frank F. Cancilla, Jr., 1449 Oakland Road,
San Jose, Calif. 95112
Filed Feb. 13, 1967, Ser. No. 615,775
U.S. Cl. 192—105
Int. Cl. F16d 43/24, 11/06, 13/04
3 Claims

ABSTRACT OF THE DISCLOSURE

A direct drive slip clutch having a drum secured to the drive axle of a racing vehicle and housing a power take-off free floating on the axle and driven from a source of power, the power take-off including a carrier for clutch shoes and a plurality of weights urged outwardly by centrifugal force into driving engagement with the drum for turning the latter.

Background of the invention (1) Field of invention is broadly in the art of clutches, class 192 and more specifically in regards to one-way engaging clutches (192 subclass 41) of the ball type (subclass 45), radial expanding (subclass 76) and cam operated (subclass 79).

(2) From a search of the records the prior art shows various types of clutches mounted directly upon the axle to be driven, but most of them embody a manual contol to manipulate the clutch, Patent No. 3,101,827 which issued Aug. 27, 1963, to Carl N. Showalter, shows a high speed clutch constructed to obtain intermittent drive by means of a trip mechanism effecting internal pinions relative to a ring gear.

This invention relates to a drive mechanism and more particularly to a clutch mechanism for effecting direct, unidirectional drive to the axle of a racing vehicle.

The racing axle clutch of the present invention is particularly useful in the drive arrangement of a go-cart racer. A go-cart racer is a small, one-man, four-wheeled vehicle of the type having a chassis mounted on relatively wide tread tires.

The driving power of such vehicle is a small engine mounted on the chassis and usually drivingly connected to a rear or drive axle of the vehicle. Heretofore, the drive connection between the engine and the drive axle included a clutch attached to the engine. Due to space and confinement thereof only a small clutch is suitable for mounting on the drive shaft of such engine. The present invention contemplates the provision of a unidirectional clutch mounted on the drive axle of the vehicle.

It is an object of the present invention to provide a unidirectional clutch consisting of a drum secured to the vehicle drive axle in combination with a free-floating power take-off drivingly connected to the engine and having a momentum means operatively associated with expandable friction type shoes tending to expand into clutching engagement with the drum under the influence of centrifugal force upon such momentum means.

These and other objects and advantages of the present invention will become apparent from a reading of the following description in the light of the accompanying drawing in which:

FIG. 1 is a perspective view of a drive mechanism having the unidirectional clutch of the present invention embodied therein.

FIG. 2 is an enlarged vertical section through the clutch of the present invention in relation to the drive axle of the vehicle.

FIG. 3 is a vertical section through a portion of FIG. 2 and taken substantially along line 3—3 therein and at a reduced scale relative thereto.

FIG. 4 is a fragmentary section radially of FIG. 3 and taken along line 4—4 thereof.

Referring to the drawing, the drive mechanism generally designated 10 comprises an engine 11, a drive axle 12 and means in the form of a belt or chain drive 13 for transmitting power from the engine to the drive axle. The drive axle 12 is mounted on wheels W which together with another set of wheel and axle supports a chassis upon which the engine is mounted in a conventional manner.

In the present disclosure the drive connection 13 is of the chain and sprocket type in which a power take-off sprocket 14 is secured to the crankshaft 15 of the engine and connected by a chain 16 to a sprocket 17 forming a part of the clutch 18 of the present invention.

The clutch 18 comprises a drum 20 having a disc 21 of substantial strength and thickness provided with a central hub 22, and also with an annular drum flange 23 projecting from its outer periphery. In the present disclosure the drum, disc and hub are shown to be built up from separate parts secured together by suitable bolts 24. It should be apparent that the drum 20, disc 21 and hub 22 may be a unitary casting serving the same purpose and intent of the present invention. The hub 22 of the drum and disc 21 is keyed to the drive axle 12 for rotation therewith.

Within the confines of the drum flange 23 a carrier 25 is mounted on ball bearings 26 supported on the drive axle 12. The inner race 27 of bearings 26 is secured to the drive axle 12 and the outer race 28 of the bearing is secured to the carrier 25 so that the latter is suitably journaled co-axially of the axle for rotation relative thereto.

Beyond the open side of the drum flange 23 is the sprocket 17 heretofore mentioned as being drivingly connected by the chain 16 to the engine 11. This sprocket 17 is secured by bolts 29 to the carrier 25 for turning the latter about the drive axle 12. As shown in FIG. 2 this sprocket may be varied in size or an additional sprocket 17' of larger size may be secured by long bolts, similar to the bolts 29, to the carrier for speed change.

The carrier 25 as best seen in FIG. 3 includes a pair of semicircular shoes 30 and 30' of identical configuration and construction. Each shoe 30 and 30' has an inwardly extending flange 31 and 31', respectively, disposed in a slot formed in the periphery 32 of the carrier. Two such slots 33 and 33' are provided diametrically opposite each other in the carrier. The flanges 31 are midway the inner and outer edges 34–34' of the brake shoes and each flange has an elongated aperture 35 formed therethrough. A bolt 36 extends through the aperture 35 of each flange 31–31', such bolt being threaded at one end 37 and secured in the carrier 25 for maintaining the shoes 30 and 30' thereon, but free to move in and out within limits with respect to the periphery of the carrier. To this end, each elongated aperture 35 has its long axis extending diagonally rather than radially relative to the semicircular shoe. Moreover, the outer limit of each aperture 35 is so disposed that when registered with the bolt 36 the shoe 30 or 30' will be concentric to the periphery 32 of the carrier 25 as well as the drum flange 23. From this location, the elongated aperture extends inwardly of the semicircular shoe of which it is a part at an angle of approximately 30 degrees from a diametric line between the two bolts 36 on which the shoes are mounted. In this manner the shoes 30 and 30' normally tend to hug inwardly of the mountings to embrace the periphery 32 of the carrier. However, when the carrier turns upon the drive axle 12, the shoes 30 and 30' tend to swing outwardly under the influence of centrifugal force.

Each of the shoes 30 and 30' is further urged in an outward direction by the influence of momentum means in the form of a plurality of metal balls 40 confined in radial pockets 41 formed in the carrier 25 and open at the periphery of the latter so that the balls will bear against the inner surface of the respective shoe.

Each shoe 30 and 30' is appropriately lined with friction material 43 on its outer arcuate surface for bearing engagement with the inner surface 44 of the drum flange 23. Consequently, when the shoes 30 and 30' are forced outwardly relative to the carrier 25 the friction material 43 lining the outer face of the shoes engages the drum flange to turn the latter unidirectionally with the carrier. In this manner, the drive axle 12 keyed to the drum 20 is turned at a speed commensurate with the r.p.m. of the sprocket 17 as driven by the drive mechanism 10.

It will be noted in FIG. 3 that the shoes 30 and 30', although tending to swing outwardly about the axes of their respective fulcrum bolts 36, they also move relatively diagonally by cam action between the elongated aperture 35 and the bolt 36. This assures against a binding of the shoe relative to the carrier and/or the drum and a reseating of the shoe concentric to the carrier upon deceleration.

While I have described the foregoing unidirectional drive clutch in specific detail it will be appreciated by those skilled in the art that the same may be susceptible to variations, alterations and/or modifications without departing from the spirit or scope of the invention therein. I therefore desire to avail myself of all variations, alterations and/or modifications as may fairly come within the purview of the appended claims.

I claim:

1. A direct drive clutch for the drive axle of a wheeled vehicle and the like having a self-contained source of motive power; said clutch comprising in combination:
    (a) a drum secured to such drive axle for turning therewith and having an annular flange;
    (b) a carrier mounted within said drum for free floating rotation on such drive axle, said carrier having guide grooves formed in its periphery diametrically opposite each other;
    (c) means for drivingly connecting such source of motive power to said carrier for turning the latter within and independently of said drum;
    (d) a pair of semi-circular shoes each having friction material on its outer surface adapted to engage the inner wall of the annular flange of said drum and each having an inwardly extending flange arranged in a respective one of the guide grooves in said carrier for guided movement inwardly and outwardly relative thereto, each of said flanges having an elongated slot formed therethrough;
    (e) shear pins mounted on said carrier and extending through each of said guide grooves and the slot formed in the flange guided therein; and,
    (f) momentum means mounted on said carrier and movable radially outward therefrom by centrifugal force for engaging and urging said semicircular shoes toward said drum for turning the latter with said carrier.

2. The device in accordance with claim 1 in which said momentum means includes:
    (a) a plurality of radially extending pockets formed in the periphery of said carrier, and
    (b) weight means arranged in each of said pockets for radial movement outwardly thereof upon rotation of said carrier into engagement with said semicircular shoes for urging the friction material on the outer surfaces of said shoes into driving engagement with the annular flange of said drum.

3. The device in accordance with claim 2 in which said weight means comprises a steel ball arranged in each of said pockets.

References Cited

UNITED STATES PATENTS

| | | | |
|---|---|---|---|
| 1,357,769 | 11/1920 | Fuchs | 192—105 |
| 1,367,738 | 2/1921 | Erickson | 192—105 |
| 2,732,051 | 1/1956 | Dalrymple | 192—105 |
| 2,836,275 | 5/1958 | Grassmuck | 192—105 |
| 3,251,445 | 5/1966 | Zuck et al. | 192—105 |

BENJAMIN W. WYCHE III, *Primary Examiner.*

U.S. Cl. X.R.

192—41